United States Patent [19]

Day et al.

[11] Patent Number: 4,589,160

[45] Date of Patent: May 20, 1986

[54] APPARATUS FOR STRIPPING FLUIDS INCLUDING DIMENSIONALLY STABLE AND SUBSTANTIALLY RIGID BAG

[76] Inventors: David R. Day, P.O. Box 52, Port Aransas, Tex. 78373; Lucian G. McElroy, 3315 Brocker Rd., Metamora, Mich. 48455

[21] Appl. No.: 619,316

[22] Filed: Jun. 11, 1984

[51] Int. Cl.⁴ .............................................. F26B 19/00
[52] U.S. Cl. .................................. 15/316 R; 34/229; 34/243 C; 285/163; 285/227
[58] Field of Search ............... 15/316 R, DIG. 2, 405; 34/222, 229, 243 C; 137/615, 351; 138/111, 115, 116, 117; 285/163, 184, 226, 227, 228, 229, 336, 364, 365

[56] References Cited

U.S. PATENT DOCUMENTS

| | | | |
|---|---|---|---|
| 374,348 | 12/1887 | Cook | 138/116 |
| 1,203,602 | 11/1916 | Fulton | 137/615 |
| 2,126,505 | 8/1938 | Risser | 285/336 |
| 2,752,172 | 6/1956 | Zielbold | 285/226 |
| 2,949,678 | 8/1960 | Anderson | 15/405 X |
| 3,263,341 | 8/1966 | Allen | 34/229 |
| 3,442,027 | 5/1969 | Hurwitz | 34/229 |
| 3,534,406 | 10/1970 | Barthlome | 285/226 |
| 3,570,042 | 3/1971 | Solomon | 15/316 R |
| 3,941,157 | 3/1976 | Barnett | 138/115 |
| 4,023,596 | 5/1977 | Tate | 138/111 |
| 4,161,801 | 7/1979 | Day | 15/316 R |
| 4,472,889 | 9/1984 | Hanna | 15/316 R X |
| 4,480,859 | 11/1984 | Rueckl | 285/163 |

Primary Examiner—Chris K. Moore
Attorney, Agent, or Firm—Harold W. Milton, Jr.

[57] ABSTRACT

An apparatus for stripping fluids from the surface of a vehicle (26) including a plurality of dimensionally stable and substantially rigid bags (12) including an inlet (14) for introducing air under pressure into the bag (12) and an elongated opening at one end of the bag (12) defining a nozzle end (16,16') of smaller cross sectional area than the inlet (14) for emitting a stream of air. A support structure including an air distributor (18) supports the bag (12) to extend toward the object (26) wherein the nozzle end (16,16') of the bag (12) lies in the path of motion of the object (26) to cause physical engagement between the nozzle end (16,16') of the bag (12) and the object (26) to bring the stream of air emitted from the nozzle opening into close spacial relationship with the surface of the object (26) to strip fluid from the object. A bellows member (36) operatively connects the bag (12) to the air distributor (18) at one end to provide flexible joints for allowing hinging movement of the bag (12) substantially along a single axis. The bags (12) are self supporting from the air distributor (18).

41 Claims, 8 Drawing Figures

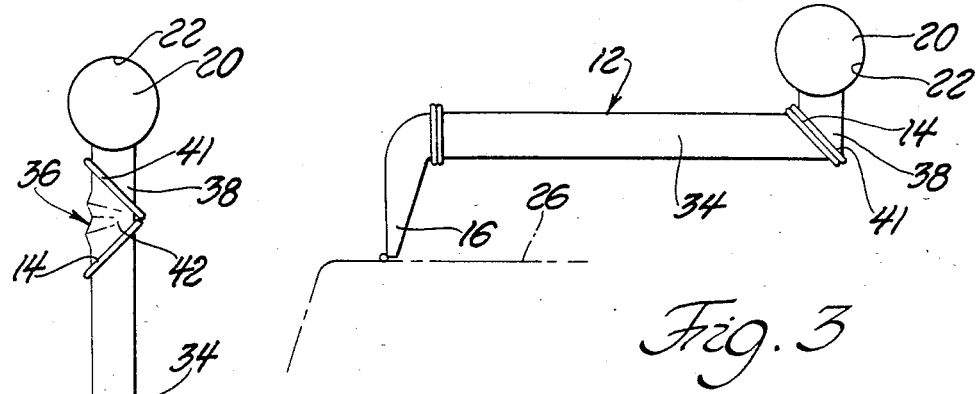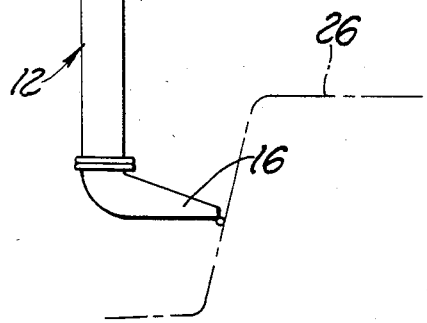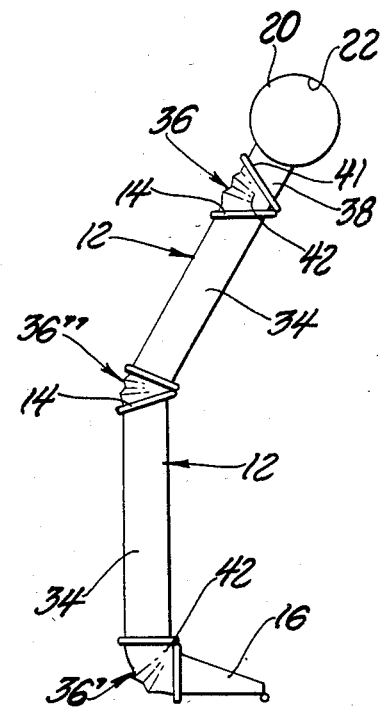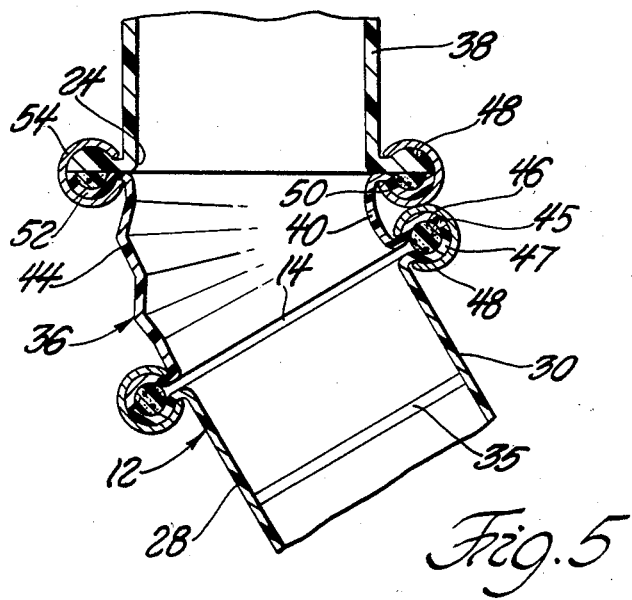

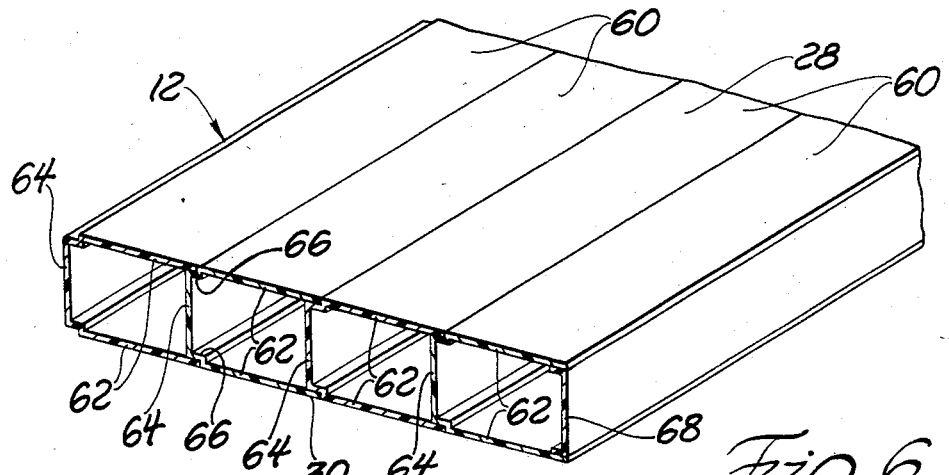
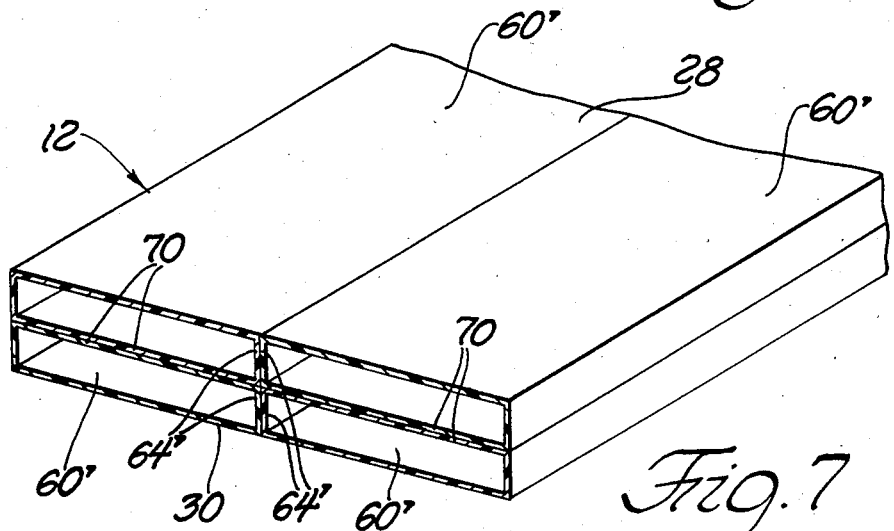
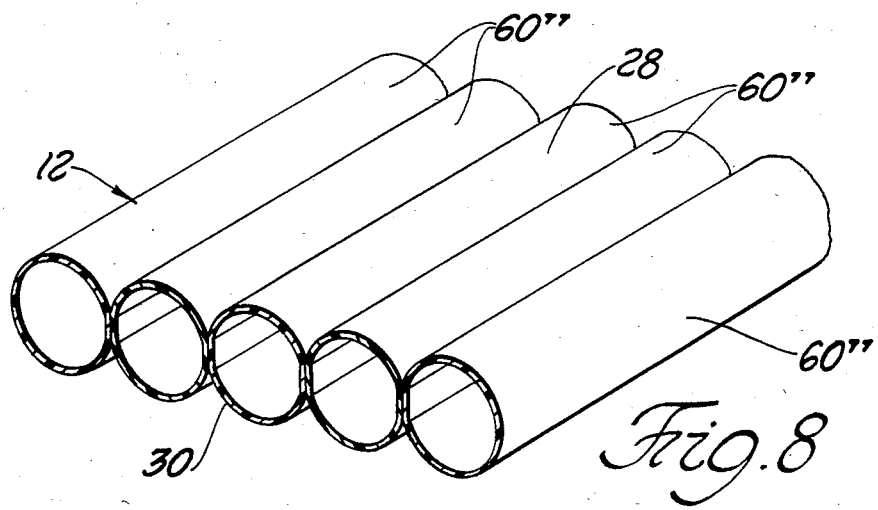

APPARATUS FOR STRIPPING FLUIDS INCLUDING DIMENSIONALLY STABLE AND SUBSTANTIALLY RIGID BAG

TECHNICAL FIELD

This invention relates to an apparatus for stripping fluids from the surface of an object. The invention is particularly suitable as being part of a car wash system for stripping rinse water from a vehicle.

BACKGROUND ART

The U.S. Pat. No. 4,161,801 to Day et al initiated the beginning of a new generation of car wash systems for effectively stripping rinse water from a vehicle passing therethrough. The invention provided a plenum supplying air under pressure and in communication with the open end of a flexible bag whereby the air is supplied through the bag to a nozzle of the bag which is in contact with the surface of a car to be stripped of water. The bag is characterized by being flexible fabric, inflatable, and of generally rectangular transverse cross section. The U.S. Pat. No. 4,409,035 to McElroy et al provided a clamp for varying the hinging action of the fluid stripping bag. The U.S. Pat. No. 3,263,341 to Allen discloses a vehicle drying assembly including rigid tube members supported by flexible sleeves from an air distributor. Such sleeves do not support the tubes so that a counterweight is required to stabilize the tubes. Further, the tubes tend to not follow the contour of a vehicle as they tend to twist about the flexible sleeves. The instant invention is directed to further improvements in the fluid stripping system.

STATEMENT OF THE INVENTION

According to the present invention, there is provided an apparatus for stripping fluids from the surface of a vehicle, the apparatus including a plurality of dimensionally stable and substantially rigid ducts supported from an air distributor in an array along the path of the vehicle and including an inlet for introducing air under pressure into the duct and an elongated opening at one end of the duct defining a nozzle of smaller cross section area than the inlet for emitting a stream of air. Flexible joint means connect the duct to the air distributor for allowing hinging movement of the duct substantially along a single axis from a neutral extended position to a flexed position relative to the support means in response to the nozzle following the contour of the surface of the object. The ducts are inflexible and self supporting from the hinge or joint means.

FIGURES IN THE DRAWINGS

Other advantages of the present invention will be readily appreciated as the same becomes better understood by reference to the following detailed description when considered in connection with the accompanying drawings wherein:

FIG. 2 is a side view of a duct mounted from the support means of the instant invention in a neutral extend position;

FIG. 3 is a side view of a duct supported by the support means in a flexed position in response to the nozzle end of the duct following the contour of the surface of a vehicle shown schematically;

FIG. 4 is a side view of a partially broken away of a second embodiment of the instant invention;

FIG. 5 is an enlarged cross sectional view of the joint means of the instant invention;

FIG. 6 is a perspective view in cross section of a duct constructed in accordance with the instant invention;

FIG. 7 is a perspective view in cross section of a second embodiment of the duct; and FIG. 8 is a perspective view in cross section of a third embodiment of the duct.

DETAILED DESCRIPTION OF THE DRAWINGS

Figure 1:
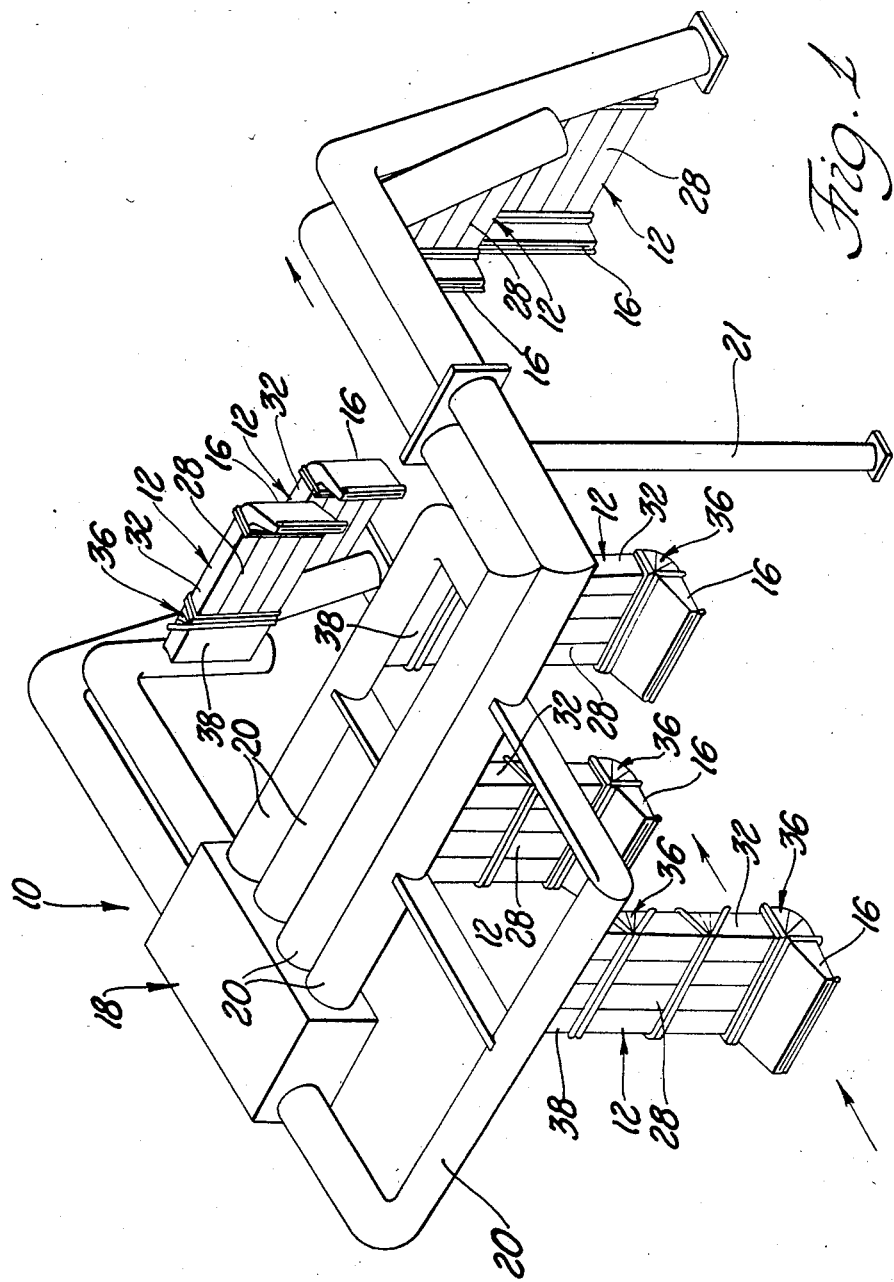
FIG. 1 is a perspective view of a drying station in a car wash system constructed in accordance with the instant invention.

A drying station of a car wash system for stripping fluids from the surface of a vehicle is generally shown at 10 in FIG. 1. The drying station 10 includes a plurality of demonsionally stable and substantially rigid ducts generally indicated at 12 which are essentially similar in that they are molded from a stable and substantially rigid material, such as a plastic. Each duct 12 includes an inlet 14 for introducing air under pressure into the duct 12 and an elongated opening at one end of the duct 12 defining a nozzle of smaller cross sectional area than the inlet 14 for emitting a stream of air. As shown in the drawings, a nozzle member 16,16' includes the elongated opening.

The ducts 12 are supported by an air distributor system generally indicated at 18. The system 18 includes a plurality of over head ducts or plenum 20 which may be supported by the ceiling super-structure of the building which houses the car wash system 10. Each plenum 20 has a chamber 22 therein and an opening 24 therethrough. The duct inlet 14 is operatively connected to the opening 24, as will be described below. As shown in FIG. 1, the air distributor 18 provides support means for supporting the ducts 12 to extend toward an object, indicated schematically in phantom at 26 in FIGS. 2 and 3, wherein the nozzle end 16 of the duct 12 lies in the path of motion of the object 26 to cause physical engagement between the nozzle end 16 of the duct 12 and the object 26 to bring the stream of air emitted from the nozzle opening into close spacial relationship with the surface of the object 26 to strip fluid from the object 26. The plurality of dimensionally stable and substantially rigid ducts 12 are supported in an array along the path of the object 26, which in the case of a car wash would be a vehicle, to strip fluid from the top and side surfaces of the vehicle 26.

Flexible joint means connect the ducts 12 to the plenum 20 for allowing hinging movement of the duct 12 substantially along a single axis from the neutral extended position as shown in FIG. 2 to the flexed position shown in FIG. 3 relative to the support means 20 in response to the nozzle 16 following the contour of the surface of the object 26. More particularly, the duct 12 is substantially rectangular in cross section and includes spaced and substantially parallel forward and rear panels 28 and 30 respectively. The duct 12 includes two side panels 32 and 34 connecting the forward and rear panels 28,30, the forward and rear panels 28,30 having a greater cross sectional dimension than the side panels 32,34.

Each of the ducts 12 include expansion preventing means form preventing the forward and rear panels 28,30 from being forced apart from the flow of pressurized fluid therebetween to maintain the forward and rear panels 28,30 in spaced parallel relationship. The expansion preventing means includes a plurality of interconnecting stringers or fingers 35 interconnecting the forward and rear panels 28,30 within the ducts 12. The stringers 35 may be integrally connected to the forward and rear panels 28,30 as the stringers 35 may be molded within the ducts 12 during the manufacturing process. The duct 12 would be an integral member which is molded to include the front and rear panels 28,30 having the stringers 35 integrally connected therebetween. The duct 12 may be manufactured by a different process utilizing other constructions of expansion preventing means.

A second embodiment of the ducts 12 is shown in FIG. 6. Each of the ducts 12 comprises a plurality of substantially tubular members 60 having predetermined and equal lengths. The tubular members 60 are connected along their lengths to form a single duct 12. When viewed in cross section, these ducts 12 have a substantially rectangular cross section. At least some of the tubular members 60 are a C-shaped member having two legs 62 and a base portion 64. One of the legs 62 defines a portion of the forward panel 28 and the other of the legs 62 defines a portion of the rear wall 30. Each of the base portions 64 provide a wall integral with and extending between the forward and rear panels 28,30 defining the expansion preventing means. Each of the legs 62 extend from the base 64 at a right angle corner. As shown in FIG. 6, the duct 12 includes a plurality of C-shaped members having the legs 62 of one C-shaped member connected to the bases 64 of the next adjacent C-shaped member at a recessed portion 66 the duct 12 includes a cover member 68 connected to the legs 62 of the most peripheral C-shaped member to form a closed tubular member therewith thereby defining the duct 12 including a plurality of tubular members 60.

The tubular members 60 may be joined together by means well known in the art, such as by glue or sonic welding.

As shown in FIGS. 6 and 7, each of the tubular members 60 and 60', respecively, may be substantially rectangular when view in cross section. As shown in FIG. 6, each of the tubular members 60 may be connected together in a single row. As shown in FIG. 7 each of the tubular members 60' may be connected together in two rows, the duct formed thereby including a plurality of walls 64' extending between the forward and rear panels 28,30 defining the expansion preventing means. A second plurality of walls 70 extend between the side panels 32,34. This construction provides greater rigidity to the duct 12 by providing expansion preventing means in the vertical and horizontal direction of the duct when viewed in cross section.

FIG. 8 shows another embodiment of the duct 12 constructed in accordance with the instant invention wherein the tubular members 60" are round when viewed in cross section.

The flexible joint means includes a bellows member 36 having an inlet connected to a duct 38 extending from the plenum 20 and an outlet connected to the inlet end 14 of the duct 12 for the flow of air therebetween. As best shown in FIG. 5, the bellows member 36 has an nonexpandable forward wall 40 operatively connected to the forward panel 30 of the duct 12 and pleated side and rear walls 42,44 respectively. The side and rear walls 42,44 are collapsible in response to the force of the passing object 26 engaging the nozzle end 16 to pivot the duct 12 about the forward wall 40. This construction provides a flexible joint which allows hinging movement of the duct 12 relative to the support means 20 substantially along a single axis. The joint is somewhat flexible as the bellows member 36 allows for slight variations which would be caused by irregularities in the surface of the object 26 being contacted while being sufficiently rigid to provide a hinging joint directing the pivoting motion of the duct 12 about the forward wall 40 thereof. Unlike prior art duct assemblies which pivoted about a portion of the duct itself, the instant invention provides additional joint means for allowing the rigid and substantially stiff duct 12 to effectively pivot in response to contacting the object 26. Prior art assemblies required further means for guiding the hinging of rigid air distributors and weights to position the assemblies. The combination of this invention provides ducts that are self supporting so as to require no further guidance means or support. In other words, the ducts are not foldable and may be cantilevered in space without depending upon inflation, i.e. without air flow. Other constructions of flexible joint means may be used to interconnect the self supporting duct 12 to the support means 20.

The side panels 32,34 of each of the ducts 12 have side edges operatively connected to respective ones of the side walls 42 of the bellows members 36. The edges taper inwardly from the front panel 40 towards the rear panel 44 so that when the duct 12 is in the neutral position, the rear panel 44 is longer in cross section than the front panel 40, as best shown in FIG. 5.

As previously stated, the support means includes a substantially rectangular duct 38 extending from the plenum 20 having front and rear walls and side walls therebetween. The side walls of the duct 38 have an edge 41 operatively connected to the bellows member 36 and tapering inwardly from the front wall thereof to the rear wall. The edge 41 of the duct 38 and the edge of the side panels 32,34 of the duct 12 define a joint that pivots approximately 90° about the forward wall 40 of the bellows member 36 as shown in FIGS. 2 and 3. In other words, the side edges 41 of the duct 38 and the side edges of the side walls 32,34 provide a joint having the bellows member 36 extending therebetween. The edges abut when the duct member 12 is moved to the flexed condition as shown in FIG. 3.

The assembly includes clamping means for sealingly clamping the bellows members 36 to the assembly. Each of the forward, rear and side panels 28,30,32,34 of the duct 12 include a substantially C-shaped flange portion 47, as shown in FIG. 5. The C-shaped flange portion 47 extends outwardly from each end of the panels 28,30,32,34. Each bellows member 36 includes an oppositely disposed C-shaped flange portion 45 extending outwardly therefrom. The clamping means includes a compressable rod member 46 disposed between the C-shaped flange portions 45,47 and a C-shaped slide clamp 48 disposed over the C-shaped portions 45,47 of the bellows member 36 and the duct 12 to sealing clamp the C-shaped portions 45,47 about the rod member 46. This clamping means provides an effective seal between bellows member 36 and the duct 12 while further securely connecting the duct 12 and bellows member 36 together. Alternatively, Valcro may be used to secure the ducts 12 and bellows members 36 together.

The duct 38 includes a flange 48 extending outwardly therefrom. The flange 48 includes a bulge extending along the flange having an outer annular surface when viewed in cross section. The clamping means further includes a compressable rod member 50 disposed between a second C-shaped flange portion 52 of the panels 40,42,44 of the bellows member 36 and the flange 48 of the duct 38. The clamping means further includes a second C-shaped slide clamp 54 disposed over the arcuate surface of the flange 48 of the duct 38 at about the flanges 52 of the panels 40,42,44 to sealingly clamp the flanges 48,52 about the rod member 50. Thus, the bellows member 36 is fixedly secured to the duct 38 and a seal is perfected therebetween. The rods 50 used for the clamping means may be made from sponge rubber. The C-shaped slide clamps 48 may be made of a metallic material.

Each duct assembly, as shown in FIGS. 2 through 4 may include one or a plurality of joint means disposed along the apparatus at successively greater distances from the support means. For example, FIGS. 2 and 3 show a single duct 12 connected to the duct 38 by a first bellows member 36 and to a nozzle 16 connected directly to the duct 12. The nozzle 16 may be constructed in accordance with the invention of U.S. Pat. No. 4,446,592, issued May 8, 1984. Such a duct assembly would normally be used as side ducts in the array of ducts shown in FIG. 1. An alternative construction of the duct assembly is shown in FIG. 4 and includes a first duct 12 connected to the duct 38 by a first bellows member 36 and a second duct 12 connected to the nozzle 16,16' by a second bellows member 36'. The two ducts 12 are connected together by a third bellows member 36''. This duct assembly has been found to be effective when used as the vertically hanging duct assembly as shown in FIG. 1. Each bellows member 36,36'36'' is disposed along the apparatus at successively greater distances from the duct. Each of the distances define a series of progressively greater moment arms relative to the joint means most proximate relative to the support means or duct 38. Each duct assembly is operatively connected to the support means 20 and includes the duct 12 and the plurality of the joint means or bellows members 36 spaced along the duct assembly at predetermined distances from the support means 20 to completely hinge each of the joint means sequentially from the joint means most proximate to the support means 20 to the joint means most distal from the support means 20. The joint or bellows member 36 closest to the duct 38 will substantially collapse to hinge the nozzle 16' before the next closet bellows member 36 will collapse. This effect causes sequential hinging of the elements of the assembly in response to the force applied to it by the passing object. In this manner, plurality of the duct assemblies are supported by the air distributor 20 in an array.

The assembly would include means for effecting relative motion indicated schematically by arrows in FIG. 1 for effecting relative motion in the direction of the arrows between the duct assemblies and the object 26 to be stripped of water thereby defining a relative path of motion. The nozzle openings of the nozzles 16,16' lie in and across the path of the object 26 as the duct assemblies extend from the air distributor 20 whereby upon relative motion of the nozzle end of the duct assemblies engage the object 26 to bring the stream of air into close spacial relationship with the surface of the object 26.

The invention has been described in an illustrative manner, and it is to be understood that the terminology which has been used is intended to be in the nature of words of description rather than of limitation.

Obviously many modifications and variations of the present invention are possible in light of the above teachings. It is therefore, to be understood that within the scope of the appended claims wherein reference numerals are merely for convenience and are not to be in any limiting, the invention may be practiced otherwise that is specifically described.

What is claimed is:

1. An apparatus (10) for stripping fluid from the surface of a vehicle (26) as the vehicle (26) is conveyed along a path through a car wash comprising: an air distributor (18); a plurality of dimensionally stable and substantially rigid ducts (12) defining a forward entrance along the vehicle path and a rear exit, said ducts (12) supported from said air distributor (18) in an array along the path of the vehicle (26) to strip fluid from the top and side surfaces of the vehicle (26), each of said ducts (12) including an inlet end (14) for introducing air under pressure into said duct (12) and a nozzle end (16,16') of smaller cross sectional area than said inlet end (14) spaced apart from said inlet end (14) for emitting a stream of air; and flexible joint means connecting said duct (12) to said air distributor (18) for allowing hinging movement of said duct (12) substantially along a single axis from a neutral extending position to a flexed position relative to said air distributor (18) in response to said nozzle end (16,16') following the contour of the surface of the vehicle (26), said ducts (12) being inflexible self supporting from said flexible joint means, each of said ducts (12) being substantially rectangular in cross section, said duct (12) including spaced and substantially parallel forward facing and rear facing panels (28,30) having a first transverse dimension and two spaced side panels (32,34) having a second transverse dimension and interconnecting said forward and rear panels (28,30), said first transverse dimension of said forward and rear panels (28,30) being greater than said second transverse dimension of said side panels (32,34), said assembly (10) further including expansion preventing means for preventing said forward and rear panels (28,30) from being forced apart by the flow of pressurized fluid therebetween to maintain said forward and rear panels (28,30) in spaced parallel relationship.

2. An assembly as set forth in claim 1 further characterized by said expansion preventing means including a plurality of stringers (35) interconnecting said forward and rear panels (28,30) within said ducts (12).

3. An assembly as set forth in claim 2 further characterized by said stringers (35) being integrally connected to said forward and rear panels (28,30).

4. An assembly as set forth in claim 1 further characterized by said flexible joint means including a bellows member (36) having an inlet connected to said air distributor (18) and an outlet connected to said inlet end (14) of said duct (12) for the flow of air therebetween, said bellows member (36) having a nonexpandable forward wall (40) operatively connected to said forward panel (30) and pleated side and rear walls (42,44) operatively connected to said side and rear panels, (28,32,34) respectively, said side and rear walls (42,44) being collapsible in response to the force of a passing object (26) engaging said nozzle end (16,16') to pivot said duct (12) about said forward wall (40).

5. An assembly as set forth in claim 4 further characterized by said side panels (32,34) of said duct (12) having side edges operatively connected to respective ones of said side walls (42) of said bellows members (36), said edge tapering inwardly from said front panel (40) towards said rear panel (44).

6. An assembly as set forth in claim 5 further characterized by said air distributor (18) including a substantially rectangular duct (38) having front and rear walls and side walls therebetween, said side walls of said duct (38) having an edge (41) operatively connected to said bellows member (36) and tapering inwardly from said front wall to said rear wall.

7. An assembly as set forth in claim 6 further characterized by said edge (41) of said duct (38) and said edge of said side panels (32,34) of said duct (12) defining a joint which pivots approximately 90° about said forward wall (40) of said bellows member (36).

8. An assembly as set forth in claim 4 further characterized by including clamping means for sealingly clamping said bellows members (36) to said assembly.

9. An assembly as set forth in claim 8 further characterized by said panels (28,30,32,34) of said duct (12) including a substantially C-shaped flanged portion (47) extending outwardly from each end therefrom, said bellows member (36) including an oppositely opposed C-shaped flange portion (45) extending outwardly therefrom, said clamping means including a compressible rod member (46) disposed between said C-shaped flange portions (45,47) and a C-shaped slide clamp (48) disposed over said C-shaped portions (45,47) of said bellows member (36) and said duct (12) to sealingly clamp said C-shaped portions (45,47) about said rod member (46).

10. An assembly as set forth in claim 9 further characterized by said bellows members (36) including a second C-shaped flange portion (52) extending outwardly from the other end thereof, said duct (38) including a flange (48) extending outwardly therefrom, said flange including a bulge extending along said flange and having an annular outer surface when viewed in cross section, said clamping means including a compressible rod member (50) disposed between said second C-shaped flanged portion (52) of said bellows member (36) and said flange (48) of said duct (38), said clamping means further including a C-shaped slide clamp (54) disposed over said arcuate surfaces of said duct flange (48) and about said second C-shaped flange portions (52) to sealingly clamp said flanges (48,52) of said duct (38) and bellows member (36) about said rod member (50).

11. An assembly as set forth in claim 10 further characterized by said rods (50) being made of sponge rubber.

12. An assembly as set forth in claim 1 further characterized by including a plurality of joint means disposed along said ducts (12) at successively greater distances from said air distributor (18), each of said distances defining a progressively greater moment arm relative to said joint means most proximately disposed relative to said air distributor (18).

13. An assembly as set forth in claim 12 further characterized by at least one of said duct assemblies including a plurality of said joint means (36) spaced along said duct assembly at predetermined distances from said air distributor (18) to completely hinge each of said joint means sequentially from said joint means most proximate to said support means to said joint means most distal from said air distributor (18).

14. An assembly as set forth in claim 13 further characterized by said joint means including a plurality of bellows members (36), each of said bellows members (36) having a nonexpandable forward wall (40) and expandable side and rear walls (42, 44), said nonexpandable forward wall (40) defining a hinging axis of said duct (12).

15. An assembly as set forth in claim 14 further characterized by at least one of said duct assemblies including a single duct (12) and a nozzle member (16') and a bellows member (36) operatively connected between said air distributor (18) and said duct (12) and a second bellows members (36') operatively connected between said duct (12) and said nozzle (16').

16. An assembly as set forth in claim 14 further characterized by said duct assembly including a pair of ducts (12) and a nozzle member (16') and a first bellows (36) operatively connecting one of said ducts (12) to said air distributor (18) and a second bellows (36") operatively connecting said ducts (12) together and a third bellows member (36') operatively connecting said other duct (12) to said nozzle (16').

17. An assembly as set forth in claim 13 further characterized by means for effecting relative motion between said duct assemblies and the vehicle (26) to be stripped of water thereby defining a relative path of motion and wherein said nozzle opening lies in and across said path of the vehicle (26) as said duct assemblies extend from said air distributor (18) whereby upon relative motion said nozzle end of said duct assembly engages the vehicle (26) to bring the stream of air into close spatial relationship to the surface of the vehicle (26).

18. An assembly as set forth in claim 1 further characterized by each of said ducts (12) comprising a plurality of substantially tubular members (60,60'60") having equal lengths and being connected together along said lengths.

19. An assembly as set forth in claim 18 further characterized by at least some of said tubular members (60) being C-shaped members having two legs (62) and a base portion (64), one of said legs (62) defining a portion said forward panel (28) and the other of said legs (62) defining a portion of said rear panel (30) and each of said base portions (64) defining said expansion preventing means.

20. An assembly as set forth in claim 19 further characterized by each of said legs (62) extending from said base (64) at a right angle corner.

21. An assembly as set forth in claim 20 further characterized by said duct (12) including a plurality of said C-shaped members having the legs (62) of one C-shaped member connected to the base (64) of the next adjacent C-shaped member, said duct (12) including a cover member (68) connected to the legs (62) of the most peripheral C-shaped member to form a closed tubular member therewith thereby defining said duct (12) including said plurality of tubular members (60).

22. An assembly as set forth in claim 18 further characterized by each of said tubular members (60,60') being substantially rectangular when viewed in cross section.

23. An assembly as set forth in claim 22 further characterized by said tubular members (60) being connected together in side-by-side relationship.

24. An assembly as set forth in claim 22 further characterized by said tubular members (60') being connected together in two rows, said duct (12) formed thereby including a plurality of said walls (64') extending between said forward and rear panels (28,32) defining said expansion preventing means and a second plurality of walls (70) extending between said side panels (32,34).

25. An assembly as set forth in claim 18 further characterized by said tubular members (60″) being round when viewed in cross section.

26. An assembly as set forth in claim 25 further characterized by said tubular members (60″) being connected together in a single row.

27. A duct (12) for use as an air distributor comprising: a dimensionally stable and rigid body portion; an inlet end (14) for introducing fluid under pressure into said duct (12); an outer end (16,16′) for emitting the stream of fluid from said duct; and flexible joint means (36) for connecting said duct (12) to an air distributor (18) and for allowing hinging movement of said duct (12) substantially along a single axis from a neutral extended position to a flexed position relative to the support structure (20), said duct (12) being substantially rectangular in cross section, said duct (12) including spaced and substantially parallel forward facing and rear facing panels (28,30) each having a first transverse dimension and two spaced side panels (32,34) each having a second transverse dimension and interconnecting said forward and rear panels (28,30), said first transverse dimension of said forward and rear panels (28,30) being greater than said second transverse dimension of said side panels (32,34), said assembly further including expansion preventing means for preventing said forward and rear panels (28,30) from being forced apart by the flow of pressurized fluid therebetween to maintain said forward and rear panels (28,30) in spaced parallel relationship.

28. A duct (12) as set forth in claim 27 further characterized by said expansion preventing means including a plurality of stringers (35) interconnecting said forward and rear panels (28,30) within said ducts (12).

29. A duct (12) as set forth in claim 28 further characterized by said stringers (35) being integrally connected to said forward and rear panels (28,30).

30. A duct (12) as set forth in claim 29 further characterized by said side panels (34) of said duct (12) having side edges operatively connected to respective ones of said side walls (42) of said bellows members (36), said edges tapering inwardly from said front panel (40) towards said rear panel (44).

31. A duct (12) as set forth in claim 27 further characterized by including a substantially C-shaped flange (47) extending about said inlet end and said outlet end and outwardly therefrom.

32. A duct (12) as set forth in claim 27 further characterized by comprising a plurality of substantially tubular members (60,60′,60″) having equal lengths and being connected together along said lengths.

33. A duct (12) as set forth in claim 32 further characterized by at least some of said tubular members (60) being C-shaped member having two legs (62) and a base portion (64), one of said legs (62) defining a portion said forward panel (28) and the other of said legs (62) defining a portion of said rear panel (30) and each of said base portions (64) defining expansion preventing means.

34. A duct (12) as set forth in claim 33 further characterized by each of said legs (62) extending from said base (64) at a right angle corner.

35. A duct (12) as set forth in claim 34 further characterized by said duct (12) including a plurality of said C-shaped members having the legs (62) of one C-shaped member connected to the base (64) of the next adjacent C-shaped member, said duct (12) including a cover member (68) connected to the ducts (62) of the most peripheral C-shaped member to form a closed tubular member therewith thereby defining said duct (12) including said plurality of tubular members (60).

36. A duct (12) as set forth in claim 32 further characterized by each of said tubular members (60,60′) being substantially rectangular when viewed in cross section.

37. A duct (12) as set forth in claim 36 further characterized by said tubular members (60′) being connected together in two rows, said duct (12) formed thereby including a plurality of said walls (64′) extending between said forward and rear panels (28,32) defining said expansion preventing means and a second plurality of walls (70) extending between said side panels (32,34).

38. A duct (12) as set forth in claim 32 further characterized by said tubular members (60) being connected together in a single row.

39. A duct (12) as set forth in claim 32 further characterized by said tubular members (60″) being round when viewed in cross section.

40. A duct (12) as set forth in claim 39 further characterized by said tubular members (60) being connected together in a single row.

41. An apparatus (10) for stripping fluid from the surface of an object as the object is conveyed along a path below said apparatus, said apparatus (10) comprising: an air distributor (18); a plurality of dimensionally stable and substantially rigid ducts (12), said ducts (12) being suspended from said air distributor (18) in a downward direction towards the path of the object to strip fluid from the surface of the object, each of the ducts (12) including an inlet end (14) for introducing air under pressure into said duct (12) and a nozzle end (16,16′) of smaller cross sectional area than said inlet end (14) spaced apart from said inlet end (14) for emitting a stream of air; and flexible joint means connecting said duct (12) to said air distributor (18) for allowing hinging movement of said duct (12) substantially along a signle axis from a neutral extended position to a flexed position relative to said air distributor (18) in response to said nozzle end (16,16′) following the contour of the surface of the object (26), said ducts (12) being inflexible self supporting from said flexible joint means, each of said ducts (12) being substantially rectangular in cross section, said duct (12) including spaced and substantially parallel forward facing and rear facing panels (28,30) having a first transverse dimension and two spaced side panels (32,34) having a second transverse dimension and interconnecting said forward and rear panels (28,30), said first transverse dimension of said forward and rear panels (28,30) being greater than said second transverse dimension of said side panels (32,34), said assembly (10) further including expansion preventing means for preventing said forward and rear panels (28,30) from being forced apart by the flow of pressurized fluid therebetween to maintain said forward and rear panels (28,30) in spaced parallel relationship.

* * * * *